US010656869B1

(12) United States Patent
Greenwood et al.

(10) Patent No.: US 10,656,869 B1
(45) Date of Patent: May 19, 2020

(54) PERFORMANCE-BASED VOLUME REPLICA MIGRATION

(71) Applicant: Amazon Technologies, Inc., Seattle, WA (US)

(72) Inventors: Christopher Magee Greenwood, Seattle, WA (US); Sriram Venugopal, Issaquah, WA (US); Mitchell Gannon Flaherty, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

(21) Appl. No.: 16/022,530

(22) Filed: Jun. 28, 2018

(51) Int. Cl.
 *G06F 11/30* (2006.01)
 *G06F 3/06* (2006.01)
 *G06N 20/00* (2019.01)

(52) U.S. Cl.
 CPC ............ *G06F 3/065* (2013.01); *G06F 3/0614* (2013.01); *G06F 3/0683* (2013.01); *G06F 11/3034* (2013.01); *G06N 20/00* (2019.01)

(58) Field of Classification Search
 CPC .... G06F 3/065; G06F 11/3034; G06F 3/0614; G06F 3/0683; G06N 20/00
 See application file for complete search history.

(56) References Cited

U.S. PATENT DOCUMENTS

| | | | | |
|---|---|---|---|---|
| 7,953,940 | B2* | 5/2011 | Kezuka | G06F 3/061 710/18 |
| 8,214,606 | B2* | 7/2012 | Kezuka | G06F 3/061 710/18 |
| 8,370,850 | B2* | 2/2013 | Nochimowski | G06F 3/0607 719/313 |
| 9,535,619 | B2* | 1/2017 | Joshi | G06F 3/0632 |
| 9,703,504 | B2* | 7/2017 | Kuwayama | G06F 3/0617 |
| 2001/0047454 | A1* | 11/2001 | Soderstrom | G06F 3/0605 711/118 |
| 2008/0256304 | A1* | 10/2008 | Kezuka | G06F 3/061 711/145 |
| 2010/0070711 | A1* | 3/2010 | Arimilli | G06F 12/0835 711/122 |
| 2010/0281216 | A1* | 11/2010 | Patel | G06F 12/121 711/118 |

(Continued)

OTHER PUBLICATIONS

Anonymous, "storage volume", Sep. 26, 2016, pp. 1-5, https://web.archive.org/web/20160926021055/http://searchstorage.techtarget.com/definition/volume (Year: 2016).*

(Continued)

*Primary Examiner* — Christopher D Birkhimer
(74) *Attorney, Agent, or Firm* — Davis Wright Tremaine LLP

(57) ABSTRACT

A movement system of a block-level data storage service obtains usage information for a data storage volume. The movement system processes the usage information to identify a placement strategy for the data storage volume that is associated with a second operational state for the data storage volume. Based on the placement strategy, the movement system causes a set of servers to perform an operation to implement the second operational state for the data storage volume. As a result of the operation being successfully performed, the movement system provides access to the data storage volume in accordance with the second operational state.

20 Claims, 10 Drawing Sheets

(56) References Cited

U.S. PATENT DOCUMENTS

| | | | | |
|---|---|---|---|---|
| 2011/0202717 A1* | 8/2011 | Kezuka | .................. | G06F 3/061 |
| | | | | 711/113 |
| 2014/0156909 A1* | 6/2014 | Farhan | ................ | G06F 12/0862 |
| | | | | 711/103 |
| 2014/0237147 A1* | 8/2014 | Joshi | .................. | G06F 12/0866 |
| | | | | 710/74 |
| 2017/0264493 A1* | 9/2017 | Cencini | ................ | G06F 9/5083 |

OTHER PUBLICATIONS

Anonymous, "RAID Migration & RAID Expansion", Oct. 17, 2016, pp. 1-3, https://thecus.kayako.conn/default_import/Knowledgebase/Article/Vew/6/0/raid-migration--raid-expansion (Year: 2016).*

* cited by examiner

US 10,656,869 B1

PERFORMANCE-BASED VOLUME REPLICA MIGRATION

BACKGROUND

Many entities seeking to reduce the expense and overhead associated with maintaining their own computing resources, such as data storage and computing capacity, have turned to solutions offered by computing resource service providers. Such distributed computing systems provide customers with the ability to generate virtual devices, such as block storage devices. As the number of volumes generated in the distributed computing system grows larger, the computing resources required to service related activity may also become quite large, maintenance of these computing resources, as well as the need to maintain the availability of these volumes, becomes increasingly important. However, maintaining these computing resources without impacting volume availability can be difficult.

BRIEF DESCRIPTION OF THE DRAWINGS

Various techniques will be described with reference to the drawings, in which.

DETAILED DESCRIPTION

Figure 1:
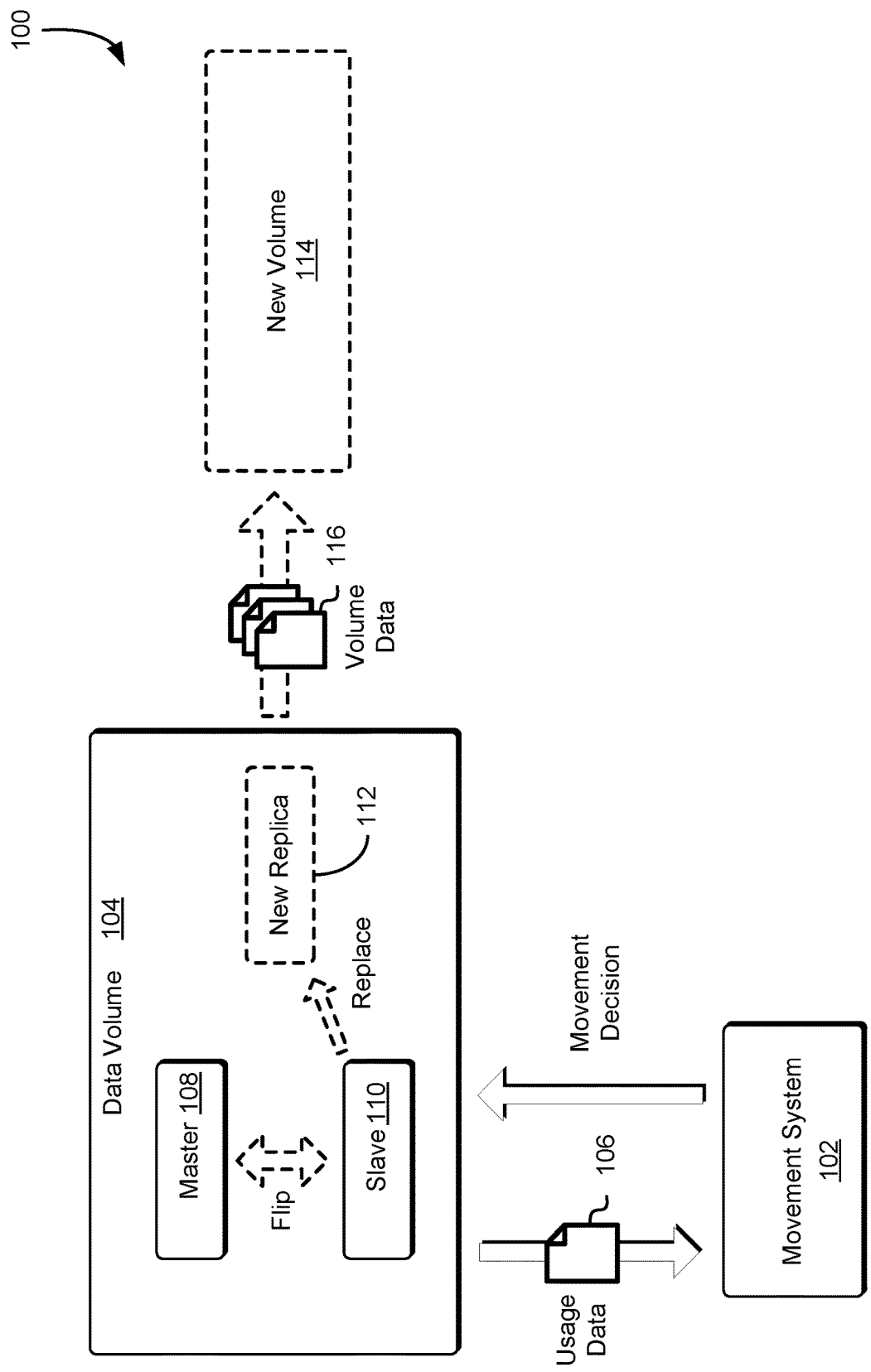
FIG. 1 shows an illustrative example of a system in which various embodiments can be implemented.

Techniques described and suggested herein relate to a movement system of a block-level data storage service for migrating replicas of data storage volumes and data storage volumes themselves to enable maintenance of computing resources of the block-level data storage service. In an example, a movement system of the block-level data storage service obtains usage data for a data storage volume maintained using servers of the block-level data storage service. A data storage volume may comprise a master replica, which is available to other resources to obtain data stored within the volume and may serve as the authoritative source of data for the volume, and a slave replica, which may be synchronized to the master replica and redundantly store the data for the volume. In an example, in order to prevent loss of the data storage volume in the event of a server failure, the master replica and the server replica are maintained on separate servers of the block-level data storage service. Thus, if the server on which the master replica is maintained is rendered inoperable, the block-level data storage service may activate the slave replica, making the slave replica the new master replica for the data storage volume.

The usage data for the data storage volume may specify the input/output (I/O) operations per second (IOPS) of the data storage volume, which may serve as an indicator of the frequency at which the volume is utilized. Further, the movement system may obtain information regarding usage of the volume from a customer profile. The customer profile may specify other resources of the customer that may utilize the data storage volume for a variety of purposes. Using the volume usage data and information obtained from a customer profile, if available, the movement system may determine whether the placement of the data storage volume is to be altered and, if so, select a way to alter the placement that is efficient based on the usage data, usage data about the server hosting the data storage volume, and usage data about other servers capable of hosting the data storage volume. For instance, if the servers utilized to manage the data storage volume are at or near their IOPS capacity or that the IOPS of the data storage volume exceeds the capabilities of the underlying servers, the movement system may determine that a new movement strategy for the data storage volume is required to ensure availability of the data storage volume.

In an example, if the movement system determines, based at least in part on the usage data, information about how in-sync the master is with the replica, and the information from the customer profile, that the volume replicas are to be flipped (e.g., the master replica is to become a slave replica and vice versa), the movement system may transmit a request to each server of the data storage volume to cause a reassignment of the master and slave replicas of the volume. For instance, if based on the usage data for the data storage volume, the movement system determines that the server that maintains the master replica of the volume is running out of available IOPS to support usage of the master replica, the movement system may determine that reassignment of the replicas of the data storage volume is required to ensure continued availability of the data storage volume. The movement system may update, within a database of the block-level data storage service, the status of the data storage volume to indicate the location of the new master replica for the data storage volume (e.g., the server that maintained the previous slave replica). This may enable read/write operations to be performed using the reassigned master replica.

In an example, the movement system determines, based on the usage data for the volume and the information from the customer profile, that the data from the volume is to be migrated to a new volume. For instance, if the movement system determines that at least one server hosting the data storage volume is running out of capacity to support additional write operations for the data storage volume, the movement system may determine that a new volume needs to be created to support further read/write operations corresponding to the data of the volume. If the movement system determines that data from the existing volume is to be migrated to a new volume, the movement system may generate this new volume using other servers from the block-level data storage service. Further, the movement system may initiate migration of the data from the older volume to the new volume. While this data is being migrated, the older volume may be available to support read operations, if the required data has not been migrated to the new volume. For instance, read requests received by the new volume may be redirected, by the new volume, to the older volume should the new volume not have the data required to fulfill the request. However, newly obtained write requests may be processed using the new volume. Once migration of the data from the older volume to the new volume has been completed, the movement system may update the status of the new volume to also enable read operations using the new volume. In an example, the movement system terminates the older volume once migration has been completed.

In an example, the movement system can alternatively determine, based on the usage data for the volume, information about server maintenance schedules, and the information from the customer profile that a new replica for the data storage volume is to be created in another server to replace an existing replica of the volume. For instance, if the movement system determines that a server that maintains a replica of the volume is scheduled for maintenance and, as a result, will be rendered inoperable for a period of time, the movement system may determine that a new replica is to be created for the volume to maintain data availability and redundancy for the volume. The movement system may create the new replica within a distinct server of the block-level data storage service and replicate data from a volume replica to this newly created replica. If the movement system detects that replication of the data from the older replica to the new created replica has been completed, the placement service may remove the obsolete volume replica. Further, the movement system may update, within a database of the block-level data storage service, an entry corresponding to the volume to indicate the location of the new replica and whether the new replica is assigned as being a master replica or a slave replica.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: ensuring availability of data for a particular volume during maintenance of servers of the block-level data storage service, transitioning data between replicas without impacting read/write latency for a volume, and preventing unavailability of server capacity as write operations are performed for volumes provided by the block-level data storage service.

FIG. 1 shows an illustrative example of a system 100 in which various embodiments can be implemented. In the system 100, a movement system 102 may obtain volume usage data 106 for a particular data storage volume 104 provided by a block-level data storage service to a customer or other entity (e.g., another service, other computing resources, etc.). The movement system 102 may be implemented on a computer system, or abstraction thereof (such as one or more virtual machines operating via a hypervisor), implemented using hardware and software, and may comprise one or more processors and memory that stores executable instructions whose execution by the one or more processors causes the computer system to perform operations described herein. In an embodiment, the movement system 102 evaluates the volume usage data 106 from the data storage volume 104, as well as other information (e.g., server information for servers that maintain the data storage volume 104, information from a profile of the entity that utilizes the data storage volume 104, etc.) to determine whether a new movement strategy is to be implemented for the data storage volume 104. The movement system 102 may be initiated on demand by the block-level data storage service or based at least in part on a schedule defined by the block-level data storage service. In some instances, the schedule may identify one or more maintenance cycles for a set of block-level data storage service servers that maintain the various data storage volumes provided by the block-level data storage service.

In an embodiment, a data storage volume 104 is block-level data storage device that can be associated with other computing resources provided by a computing resource service provider. For instance, a data storage volume 104 may be associated with a virtual machine, whereby the data storage volume 104 may provide storage for data of the virtual machine. A data storage volume 104 may be generated to provide a particular level of IOPS capacity and other performance characteristics to meet the requirements of the entities that utilize data storage volumes to provide storage capacity for their computing resources. The data storage volume 104, in an embodiment, is replicated utilizing distinct servers provided by the block-level data storage service to prevent data loss in the event of failure of any single hardware component of a server that maintains the data storage volume 104. Thus, the data storage volume 104 may include a master replica 108 and a slave replica 110, which may each be maintained in distinct servers. The master replica 108 and the slave replica 110 may each be implemented on a storage device, such as a solid-state drive (SSD), a hard disk drive (HDD), and the like. Alternatively, the master replica 108 and the slave replica 110 may each be an abstraction of a storage device (e.g., a virtual machine operating via a hypervisor, a virtualized storage device, a logical storage device, etc.). Thus, the data storage volume 104 may be an abstraction layer that comprises the master replica 108 and the slave replica 110. The master replica 108 may serve as the primary source of data for the other computing resources associated with the data storage volume 104. For instance, a user utilizing a computing resource that is associated with the data storage volume 104 may perform read/write operations using the master replica 108 of the data storage volume 104, which may be accessible via the computing resource. The slave replica 110 may be synchronized with the master replica 108 to ensure that the maintained on the slave replica 110 is what is present in the master replica 108.

In an embodiment, the volume 104 records volume usage data 106 for the data storage volume 104. The volume usage data 106 may specify usage information for the volume 104 over a period of time. For instance, the volume usage data 106 may specify the IOPS of the data storage volume 104 over the period of time. Further, the volume usage data 106 may provide information regarding the servers that maintain the master replica 108 and the slave replica 110 of the data storage volume 104. For example, the volume usage data 106 may specify the remaining amount of capacity available in a particular server, the average available IOPS capacity for the server, whether a server is scheduled for maintenance, and the like. In some instances, the volume usage data 106 may also specify configuration information for the data storage volume 104, such as a pre-configured duration for the data storage volume 104, any customer requirements for availability of the data storage volume 104, any customer requirements for performance of the data storage volume 104 (e.g., IOPS capacity, storage capacity, etc.), and the like. In an embodiment, the volume usage data 106 is supplemented using information from a customer profile corresponding to an entity that utilizes the data storage volume 104 for its purposes. This information may include a subset of data that may otherwise be included in the volume usage data 106, such as the aforementioned customer requirements for availability and performance of the data storage volume 104. In an embodiment, additional usage data is utilized in conjunction with the volume usage data 106 to identify a movement strategy. This additional usage data may include data corresponding to usage of other servers of the block-level data storage service (e.g., load and performance metrics for each other server that is utilized for a purpose other than implementing the data storage volume 104, etc.).

The movement system 102, based at least in part on the volume usage data 106 obtained for the data storage volume 104 and any other information from the customer profile, may determine whether an alternative movement strategy for the data storage volume 104 is to be implemented. In an embodiment, the movement system 102 also evaluates other information to determine the impact of performing each of the available movement strategies. For example, the movement system 102 may determine the impact to availability of data from the data storage volume 104 corresponding with flipping the replicas of the data storage volume 104, migrating the data from the data storage volume 104 to a new data storage volume 114, creating a new replica for the data storage volume 104, and any other possible operational state for the data storage volume 104. This may include determining the amount of network bandwidth required to perform any of the aforementioned processes, determining the amount of time data is rendered unavailable during performance of any of the aforementioned processes, determining the amount of storage and IOPS capacity required to perform any of the aforementioned processes, determining the performance impact to read/write operations in performing any of the aforementioned processes, and the like. For example, each movement strategy can be scored. The movement system 102, utilizing a comparison of the scores as input may determine the optimal operational state for the data storage volume 104. This may include performing operations corresponding to a selected movement strategy or, if the volume is determined to be in its optimal operation state, maintain the data storage volume 104 in its present configuration.

In an embodiment, each of the available movement strategies is scored based at least in part on one or more factors corresponding to the potential impact of implementing a movement strategy on the servers of the block-level data storage service and on the customer's other data storage volumes. The movement system 102 may utilize the usage data 106 from the data storage volume 104, as well as additional usage data for other data storage volumes and servers of the block-level data storage service, to determine an original state of the service. The original state of the service may indicate the IOPS capacity and usage for each data storage volume and server, as well as the remaining storage capacity for each data storage volume and server of the block-level data storage service. Using the original state of the service as a baseline, the movement system 102 may evaluate each movement strategy to determine which movement strategy, if implemented, would result in either an improvement in the performance of the service or cause the least negative impact to the service. For instance, the movement system 102 may evaluate the potential impact of reassigning the replicas of the data storage volume 104 on the servers that maintain the replicas of the data storage volume 104 (e.g., increases in the network bandwidth to the server that maintains the new master replica 108 as a result of the reassignment, etc.). Based on this potential impact to the servers that implement the replicas of the data storage volume 104, the movement system 102 may determine whether the potential impact to these servers has any effect on other data storage volumes of the customer or of other customers of the block-level data storage service. This potential impact to the servers that implement the replicas of the data storage volume 104 and to other data storage volumes, the movement system 102 may assign a score to this particular movement strategy.

The movement system 102 may also assign a score to the other possible movement strategies. For instance, the movement system 102 may determine the potential impact to the server that is to implement a new volume replica 112 for the data storage volume 104 (e.g., impact to network bandwidth and capacity, impact to IOPS capacity, impact to storage capacity, etc.) and to any corresponding data storage volumes that have a replica implemented on the particular server, resulting in a score for this movement strategy. Based on these factors, the movement system 102 may assign a score to this movement strategy. As another example, the movement system 102 may also determine the potential impact to servers selected for implementation of a new data storage volume 114, as well as the resulting impact to the overall network bandwidth of the service resulting from data migration from the original servers of the data storage volume 104 to the servers that implement the replicas of the new data storage volume 114. Similar to the previously described evaluations, the movement system 102 may also determine whether the potential impact to the servers that implement the new data storage volume 114 has any effect on other data storage volumes of the customer or of other customers of the block-level data storage service. These factors may be used to assign a score to this movement strategy. Thus, based on the scores assigned to each available movement strategy, the movement system 102 may select a movement strategy that provides optimal operation for the data storage volume 104 and for the service as a whole.

In an embodiment, each movement strategy is scored using a heuristic (e.g., a linear or other combination of numerical representations of a plurality of factors) or other model. As one example, and as previously stated, a factor is the impact to the network bandwidth of the destination server (e.g., servers wherein new replicas are being created, servers wherein replicas of a data storage volume are being reassigned, etc.). As another example, a factor is the impact to the IOPS capacity of the destination server. As yet another example, a factor is the impact to the storage capacity of the destination server in implementing new replicas. Other factors that may be utilized in the heuristic include, but are not limited to: impact to the network bandwidth of the servers that implement the customer's data storage volumes, impact to the network bandwidth of the servers that implement other customer's data storage volumes, impact to the IOPS capacity of the servers that implement the customer's data storage volumes, impact to the IOPS capacity of the servers that implement other customer's data storage volumes, duration of any outage to customer's data storage volumes (including the data storage volume for which replicas are either being reassigned or moved) during execution of the movement strategy, the expense to the customer in executing the movement strategy, the expense to the service in executing the movement strategy, the mitigating effect of implementing the movement strategy to address an issue with one or more servers of the block-level data storage service, time required to implement the movement strategy, and the like.

As an example, factor values demonstrating a decrease in the IOPS capacity (e.g., percentage decrease from present IOPS capacity for a data storage volume, represented via a negative percentage value) may bias the model away from a movement strategy that involves utilizing the servers that maintain the replicas (e.g., reassignment of the replicas) and towards a movement strategy that involves creating a new replica in a different server or migrating the replicas of the data storage volume to other servers of the fleet. As another example, factor values demonstrating a decrease in storage capacity for servers that implement a data storage volume (e.g., percentage decrease from present storage capacity for a data storage volume, represented via a negative percentage value) may also bias the model away from reassignment of the replicas and towards a movement strategy that involves creating a new replica in a different server or migrating the replicas of the data storage volume to other servers of the fleet. In another example, factor values demonstrating an increase in the network bandwidth for implementing a movement strategy that involves migrating data to a new replica on a new server may bias the model away from movement strategies involving creation of new replicas on other servers and/or creation of a new data storage volume to replace the existing data storage volume. Similarly, factor values demonstrating a period of unavailability of the customer's data during migration of a replica to a different server may bias the model away from movement strategies that involve any data migration, favoring instead a reassignment of the existing replicas for the data storage volume. In another example, the movement system 102 determines the cost of implementing each movement strategy, such that the factor corresponding to the expense to the customer and the factor corresponding to the expense to the service are biased towards the least expensive movement strategy to be implemented. In another example, factor values associated with the mitigating effect of implementing a movement strategy may bias towards a movement strategy that results in the elimination or mitigation of one or more issues associated with the service requiring a change to the performance state of the data storage volume. In yet another example, factor values associated with the time required to implement a movement strategy may bias towards the movement strategy that requires the least amount of time to implement. Based on the resulting factor values for each factor, the movement system 102 may utilize the heuristic to select a movement strategy.

If the movement system 102 determines, based at least in part on the volume usage data 106 and the other information from the customer profile, that at least one server that maintains the data storage volume 104 is exhausting its storage capacity, the movement system 102 may determine that the data storage volume 104 should be migrated to other servers of the block-level data storage service fleet of servers. In an embodiment, to perform this migration, the movement system 102 identifies a set of servers that may be used to implement a new data storage volume 114 for storage of the data of the data storage volume 104. For instance, the movement system 102 may identify a first server that can be used to maintain the master replica for the new data storage volume 114 and a second server that can be used to maintain the slave replica for the new data storage volume 114. These replicas may be created in the identified servers and the movement system 102 may update a database or other management system of the block-level data storage service to indicate that the new data storage volume 114 is to be utilized for write operations associated with the computing resources associated with the data storage volume 104.

In response to the new data storage volume 114 having been created, the movement system 102 may initiate migration of the data from the master replica 108 and the slave replica 110 of the data storage volume 104 to the corresponding master replica and slave replica of the new data storage volume 114. For instance, the movement system 102 may migrate the volume data 116 stored in each of the master replica 108 and the slave replica 110 to the new data storage volume 114. During migration of the volume data 116 to the new data storage volume 114, the data storage volume 104 may continue to process read operations for any data that may still be maintained on the master replica 108 of the data storage volume 104. For instance, the new data storage volume 114 may receive a read request from a user or other server for certain data. This data may still be stored in the data storage volume 114, as it has not been migrated to the new data storage volume 114. Thus, the new data storage volume 114 may redirect this read request to the data storage volume 104, which may fulfill the request. However, any write operations, as mentioned above, may be processed by the new data storage volume 114. In an embodiment, once migration of the volume data 116 has been completed, the movement system 102 updates the database or other management system of the block-level data storage service to indicate that the new data storage volume 114 is to be utilized for all read/write operations associated with the computing resources now associated with the new data storage volume 114. Alternatively, the movement system 102 may memorialize the state of the data storage volumes internally in a datastore. Further, the movement system 102 may terminate the data storage volume 104 as it no longer maintains data associated with the customer's computing resources. Alternatively, the movement system 102 may maintain the data storage volume 104 to provide additional redundancy for the data stored within the master replica of the new data storage volume 114.

In an embodiment, based at least in part on the volume usage data 106 and the other information from the customer profile, the movement system 102 may determine that reassignment of the master replica 108 and the slave replica 110 is to be performed, resulting in the master replica 108 becoming the slave replica for the data storage volume 104 and the slave replica 110 becoming the master replica for the data storage volume 104. For instance, the movement system 102 may make this determination if, based at least in part on the volume usage data and the other information, the server that maintains the master replica 108 is exhausting its IOPS capacity, resulting in potential IOPS impact for the data storage volume 104. Further, the server that maintains the slave replica 110 may have sufficient IOPS capacity to support the data storage volume 104. As another example, the movement system 102 may also make this determination if the data storage volume 104 is configured for a short duration lifespan, whereby migration of the data of the data storage volume 104 would result in potential unavailability of the data storage volume prior to its expiration.

The movement system 102 may update the database or other management system of the block-level data storage service to reassign the master replica 108 and the slave replica 110 for the data storage volume 104. Alternatively, the movement system 102 may memorialize the state of the data storage volume internally in a datastore, specifying that the reassignment of the replicas has been completed. This may result in the status of the data storage volume 104 being updated to indicate that the server that previously maintained the slave replica 110 now maintains the master replica for the data storage volume 104. This may cause any read/write operations for the data storage volume 104 to be directed to the server that previously maintained the slave replica 110 for the data storage volume 104, as this server now maintains the master replica for the data storage volume 104. Further, synchronization of data between the replicas of the data storage volume 104 may continue to be performed, as reduced IOPS capabilities for the server that maintains the slave replica may not impact this synchronization process.

In an embodiment, based at least in part on the volume usage data 106 and the other information from the customer profile, the movement system 102 may determine that a new replica 112 for the data storage volume 104 is to be created, while an obsolete replica of the data storage volume 104 is to be removed once the new replica 112 has been synchronized to maintain the data for the data storage volume 104. For instance, the movement system 102 may make this determination if, based at least in part on the volume usage data and the other information, a replica of the data storage volume needs to be moved to prevent correlated volume failures for various customers of the computing resource service provider. Additionally, or alternative, the movement system 102 may make this determination of a server that maintains a replica of the data storage volume 104 is scheduled for maintenance, which may result in the server being unavailable during maintenance. The movement system 102 may also make this determination if it detects that a server that maintains a replica for the data storage volume 104 has unexpectedly become unavailable for use.

The movement system 102 may identify another server that may implement the new replica 112 for the data storage volume 104. For instance, if the new replica 112 is to serve as a slave replica for the data storage volume 104, the movement system 102 may identify a server that has sufficient storage capacity to store the data associated with the data storage volume 104 and is capable of performing a synchronization process with the server that maintains the master replica 108. This identified server may also be selected to have sufficient IOPS capacity such that, in the event of unavailability of the master replica 108, the new replica 112 may be used as the new master replica for the data storage volume 104 and, hence, support read/write operations for the data storage volume 104. Alternatively, if the new replica 112 is to serve as the master replica for the data storage volume 104, the movement system 102 may prioritize both storage and IOPS capacity for selection of the server that is to maintain the new replica 112. Once a server has been identified, the movement system 102 may generate the new replica 112 within this server and initiate replication of the data from either the master replica 108 or the slave replica 110 (e.g., whichever replica is to be removed).

In response to detecting complete replication of the data from the data storage volume 104 into the new replica 112, the movement system 102 may update the database or other management system of the block-level data storage service to indicate creation of the new replica 112 and assignment of the new replica 112 for the data storage volume 104. Alternatively, the movement system 102 may memorialize the state of the data storage volume internally in a datastore, such that the datastore includes an entry for the data storage volume 104 that specifies that the new replica 112 is associated with the data storage volume 104. Further, the movement system 102 may remove any association between the data storage volume 104 and the obsolete replica of the data storage volume 104. This may prevent any read/write operations or synchronization processes from being performed using the obsolete replica. If the update to the database or other management system is successful, the movement system 102 may remove the obsolete replica to create additional capacity in the server that maintained the obsolete replica. It should be noted that while the aforementioned placement strategies are described extensively throughout the present disclosure, other placement strategies may be implemented based at least in part on the performance of the data storage volume 104 and the underlying servers that provide functionality for the data storage volume 104.

In an embodiment, the movement system 102 utilizes machine learning techniques, such as supervised learning techniques to determine an optimal movement strategy for replicas of the data storage volume 104. A machine learning system may use training data about the storage service to build a machine learning model that can be used to control placement and/or selecting movement strategies. In this example embodiment, the training data can be fed into a machine learning system and a classification algorithm to build a model that clusters volumes into movement strategy categories. In this example embodiment, input data to train a machine learning model such as, the volume usage data 106 for a particular data storage volume 104 and other information from the customer profile or other sources that may be pertinent to identifying a movement strategy for replicas of the data storage volume 104. The other information may include metrics corresponding to performance of any of the available operational states for the data storage volume 104. These metrics may correspond to the amount of network bandwidth that is to be consumed in transitioning to a new operational state, the amount of storage capacity required in transitioning to a new operational state, the impact to availability of data during migration, and the like. Further, in some instances, the machine learning system may also utilize volume usage data for other data storage volumes of the customer and/or of other similar data storage volumes of the customer or of other customers (e.g., same type, maintained using similar server types, etc.). In an embodiment using supervised learning, the input data can also include indications of whether a movement strategy was correct for a given volume. For example, a customer's analyzed behavior based at least in part on the selections made by the customer with regard to provisioning and management of its data storage volumes, and the like can be used to infer whether a movement strategy was correct for the customer, or an administrator of the storage service can identify correct movement strategies in the data based on operational metrics after the movement. A machine learning system may, at any time, utilize one or more sample vectors to perform one or more simulations to determine whether the functions utilized by the movement system 102 to determine a movement strategy for a data storage volume are producing correct and accurate results and/or to refine the one or more functions utilized by the movement system 102 to produce correct and accurate results. For instance, during initialization of the machine learning system, the movement system 102 may provide the machine learning system with one or more sample vectors and analytical results (e.g., desired outcomes) that should be obtained based at least in part on these one or more sample vectors. The machine learning system, based at least in part on this exercise, may adjust the functions utilized by the movement system 102 to analyze the vectors corresponding to activity associated with use of the data storage volume 104.

The machine learning system may receive input from one or more analysts employed by the computing resource service provider to analyze the results from the one or more analyses performed by movement system 102 through use of the one or more functions described above. For instance, an analyst may review the volume usage data 106, other information from a customer profile and/or other sources, and the one or more vectors generated by the movement system 102 to determine whether the selected movement strategy should be implemented. The analyst may provide his/her input for use in refining the model used to classify vector input as corresponding to any of the aforementioned placement strategies or to another movement strategy altogether. The vector of measurements corresponding to the review performed by the analyst and the desired outcome corresponding to the analyst's input may be used by the machine learning system to update the model used to classify vector inputs. Such may be performed by multiple analysts and/or using multiple vector inputs to provide the machine learning system a sufficient number of sample vector inputs and desired outputs. The machine learning system may adjust the one or more models used by the movement system 102 to increase the likelihood that the desired result is obtained in future analyses.

The model used to classify measurement vectors may vary in accordance with various embodiments. For example, in some embodiments, support vector machine techniques are used to classify regions in Euclidean space as indicative of a need to migrate the data of the data storage volume 104 to a new data storage volume 112, indicative of a need to create a new replica 112 for the data storage volume 104, or indicative of a need to reassign the master replica 108 and the slave replica 110 of the data storage volume 104. This may be used so that measurements are classified in accordance with the region in which the measurement vectors fall. In yet another embodiment, the machine learning system can utilize decision tree learning to determine a decision (classification, regression) tree used to classify vector input indicative of a need to migrate the data of the data storage volume 104 to a new data storage volume 114, indicative of a need to create a new replica 112 for the data storage volume 104, indicative of a need to reassign the master replica 108 and the slave replica 110 of the data storage volume 104, or of the current movement strategy being optimal for the data storage volume 104 (e.g., no change in placement is required). As a fictitious illustrative example, if a minimum requirement established by the movement system 102 for classifying a data storage volume 104 as necessitating a migration to a new data storage volume 114 is that the storage capacity of the servers that support the data storage volume 104 is below a particular threshold, the machine learning may result in a decision tree that, at least in part, bifurcates based on vector components indicating whether the available capacity for the servers that maintain the data storage volume 104 is lower than a threshold amount of storage capacity and whether the predicted amount of future storage required by the data storage volume 104 will not be available through the servers. If the input indicates that the servers have storage capacity that is below the threshold and that the frequency at which data is written for the data storage volume 104 will result in the servers being unable to satisfy the demand, the one or more functions (decision trees) would, in this example, provide a result that the data of the data storage volume 104 is to be migrated to a new data storage volume 114 on servers that have sufficient capacity to satisfy this predicted demand. Thus, the machine learning algorithm may adjust the one or more functions if these one or more functions do not indicate that the data of the data storage volume 104 should be migrated to a new volume 114.

Figure 2:
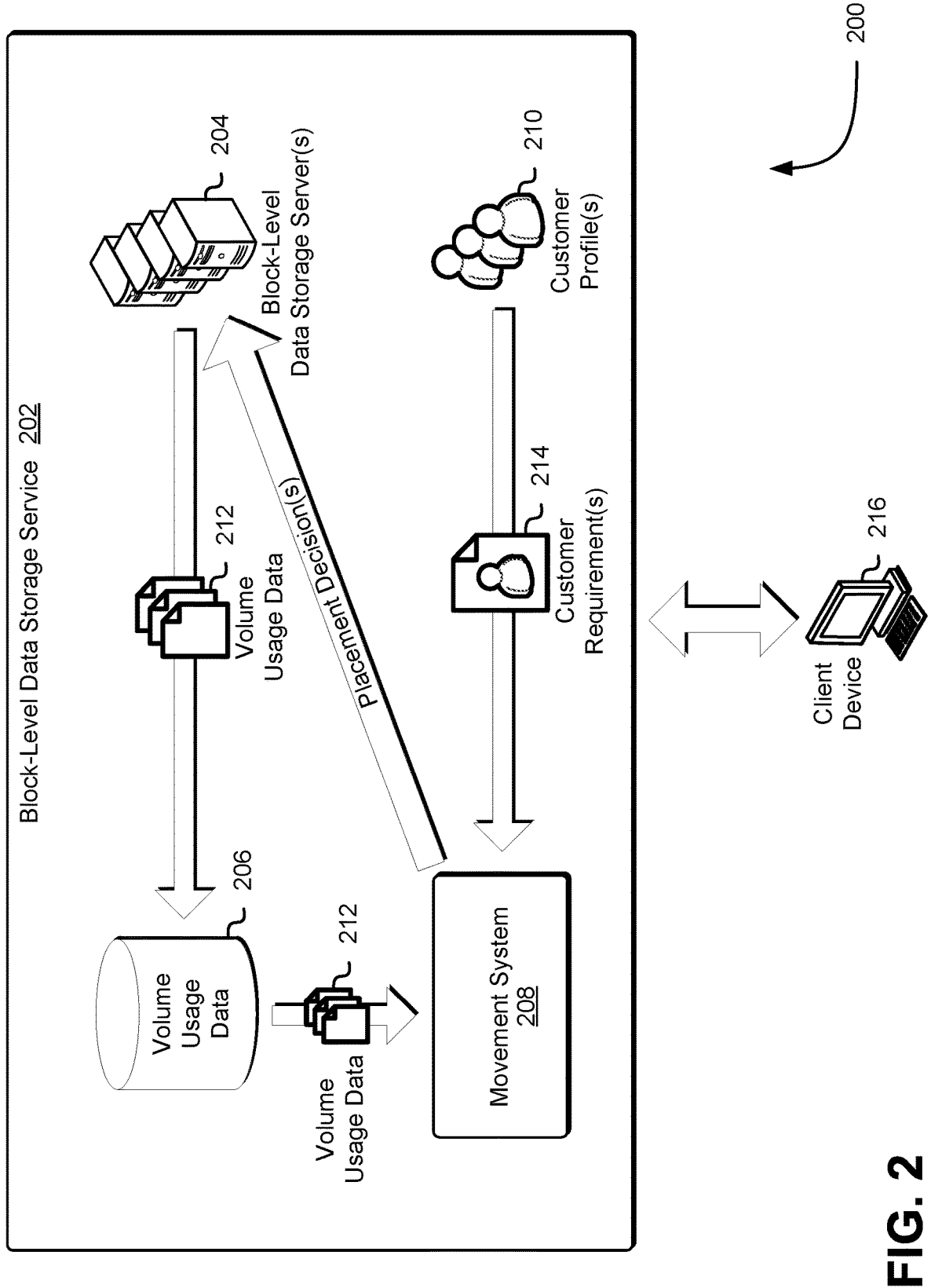
FIG. 2 shows an illustrative example of a system in which a movement system of a block-level data storage service determines placement of a volume replica based at least in part on volume usage data in accordance with at least one embodiment.

FIG. 2 shows an illustrative example of a system 200 in which a movement system 208 of a block-level data storage service 202 determines placement of a volume replica based at least in part on volume usage data 212 in accordance with at least one embodiment. In the system 200, a block-level data storage service 202 provides customers, via their client devices 216, storage capabilities for their computing resources, which may be maintained by a computing resource service provider or other service provider. The block-level data storage service 202 may be a computer system, or abstraction thereof (such as a one or more virtual machines operating via a hypervisor), implemented using hardware and software, and may comprise one or more processors and memory that stores executable instructions whose execution by the one or more processors causes the computer system to perform operations described herein, including providing some or all of the functionality described as a service accessible to entities (e.g., the client device 216, etc.) connecting to the implementing computing resource service provider. For instance, the block-level data storage service 202 may provide persistent block-level data storage volumes for use with other computing resources provided by the implementing computing resource service provider. Further, the block-level data storage service 202 may replicate these data storage volumes to ensure availability of the data storage volumes in the event of a component failure.

The data storage volumes may be provisioned via block-level data storage servers 204 provided by the block-level data storage service 202. Each block-level data storage server may provide a variety of computing resources and components to enable creation and maintenance of data storage volumes. As noted above, each data storage volume may include a master replica and a slave replica, whereby the replicas of the data storage volume are maintained in distinct data storage servers to ensure availability of the data storage volume in the event of a component failure or other unavailability. Thus, for a given data storage volume, a block-level data storage service may maintain either a master replica or a slave replica of the data storage volume. A block-level data storage server may provide storage capacity to accommodate replicas for data storage volumes, as well as IOPS capacity to support read/write operations for each of these replicas. In an embodiment, each block-level data storage server records volume usage data 212 for each data storage volume for which a replica is maintained. Alternatively, if a data storage volume is configured to perform a process for evaluating usage of its replicas, the data storage volume may record its own volume usage data 212.

Volume usage data 212 for each of these data storage volumes may be stored in a volume usage data repository 206. The volume usage data repository 206 may include a relational database or other datastore that includes an entry for each data storage volume provided by the block-level data storage service 202. Each entry may specify identifiers corresponding to volume usage data 212 for the particular data storage volume. Thus, by identifying an entry for a particular data storage volume, it is possible to obtain the volume usage data 212 for the particular data storage volume collected over time from the block-level data storage servers 204.

In an embodiment, the block-level data storage service 202 maintains a movement system 208, which monitors volume usage data 212 for data storage volumes maintained by the block-level data storage service 202 to identify an optimal movement strategy for each of these data storage volumes. For instance, the movement system 208 may utilize an identifier corresponding to a particular data storage volume to identify an entry within the volume usage data repository. Using the entry, the movement system 208 may identify the corresponding volume usage data 212 for the data storage volume and obtain the volume usage data 212 for evaluation in accordance with the methods described above in connection with FIG. 1. Further, the movement system 208 may obtain other information from a customer profile corresponding to the customer that requested provisioning of the data storage volume for its use. For instance, the movement system 208 may identify, from a customer profile repository 210, a profile corresponding to the customer. The customer profile may specify customer requirement information 214, which may specify the requirements for each of the customer's data storage volumes (e.g., IOPS requirements, storage capacity requirements, any associated computing resources logically attached to the data storage volumes, latency limitations, size of the data storage volumes, data throughput, etc.). Using the identifier of the data storage volume, the movement system 208 may identify, from the customer profile repository, the corresponding customer profile and the customer requirement information 214. The movement system 208 may utilize the volume usage data 212 and the customer requirement information 214 as input to the aforementioned machine learning algorithms to identify a movement strategy for the data storage volume.

Based at least in part on the identified movement strategy for the data storage volume, the movement system 208 may determine whether any alteration to the current placement of any of the replicas of the data storage volume or of the data storage volume itself is required. For instance, if the movement system 208 determines, from the identified movement strategy, that a new data storage volume is required to replace an existing data storage volume, the movement system 208 may select, from the block-level data storage servers 204, a new set of block-level data storage servers that may implement the master and slave replicas of the new data storage volume. Further, once the new data storage volume has been provisioned, the movement system 208 may cause the block-level data storage servers that maintain the existing data storage volume to migrate the data of the existing data storage volume to the new data storage volume. As another example, if the movement system 208 determines that a new replica is to be created to replace an obsolete replica of a particular data storage volume, the movement system 208 may identify a new block-level data storage server that may implement the new replica and cause synchronization of the data of the particular data storage volume with the new replica. Once data replication has been completed, the movement system 208 may update a database of the block-level data storage service 202 to associate the new replica with the data storage volume. Further, the movement system 208 may remove the obsolete replica. In yet another example, if the movement system 208 determines that the master replica and the slave replica for a data storage volume are to be reassigned (e.g., flipped such that the master replica becomes the slave replica and vice versa), the movement system 208 may update the corresponding block-level data storage servers and the database of the block-level data storage service 202 to reassign these replicas. This may cause read/write requests to be processed by the server that previously maintained the slave replica for the data storage volume, as this slave replica has been reassigned by the movement system 208.

Figure 3:
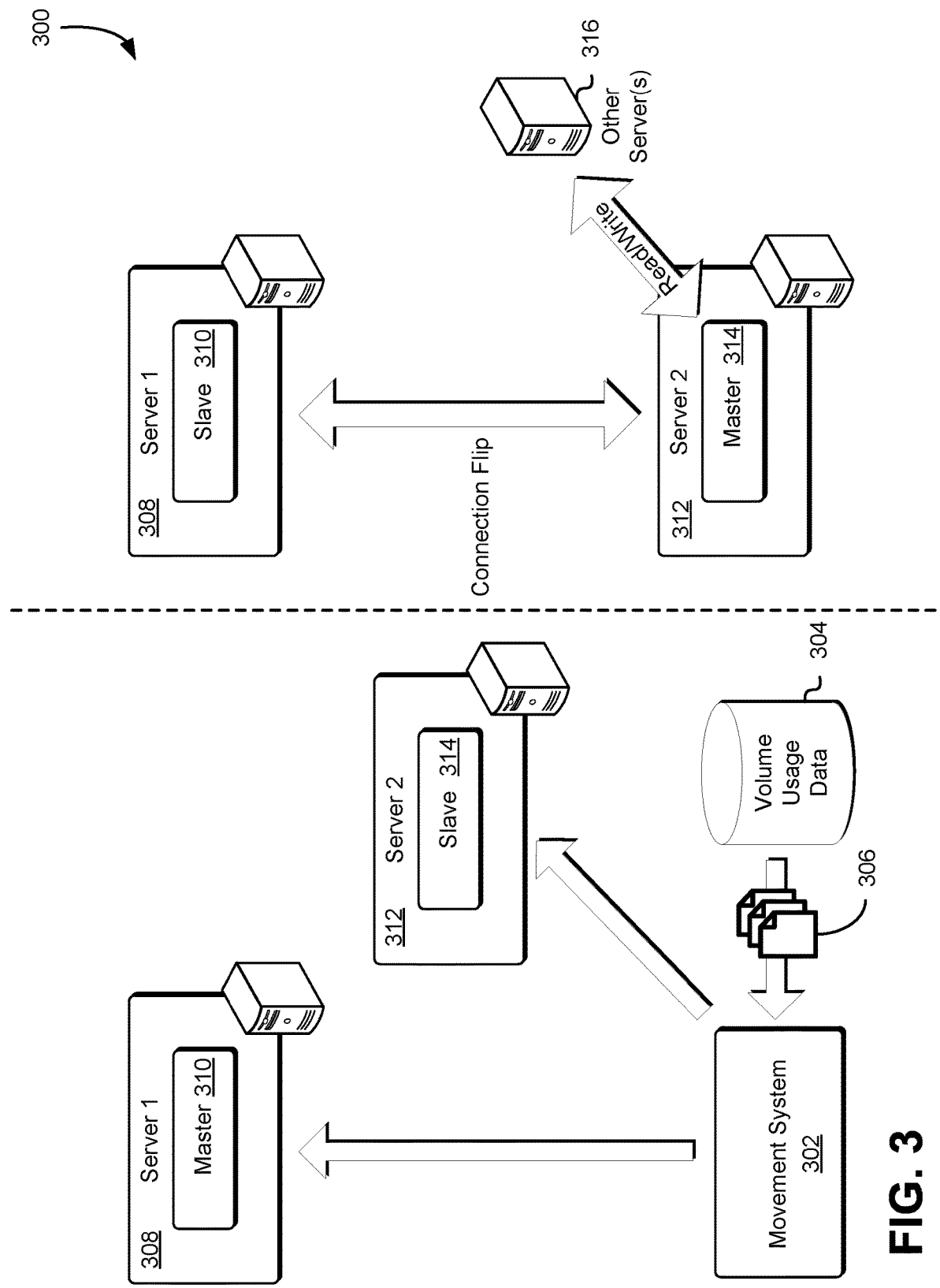
FIG. 3 shows an illustrative example of a system in which a movement system causes a flip between a master replica and a slave replica of a data storage volume based at least in part on volume usage data for the data storage volume in accordance with at least one embodiment.

As noted above, the movement system, based at least in part on volume usage data for a particular data storage volume and other information from a customer profile, may determine a movement strategy for the data storage volume that includes reassigning the master and slave replicas of the data storage volume. Accordingly, FIG. 3 shows an illustrative example of a system 300 in which a movement system 302 causes a flip between a master replica 310 and a slave replica 314 of a data storage volume based at least in part on volume usage data 306 for the data storage volume in accordance with at least one embodiment. In the system 300, the movement system 302 obtains volume usage data 306 for a particular data storage volume from the volume usage data repository 304. The movement system 302 may use this volume usage data 306, as well as other information associated with the data storage volume (e.g., availability requirements, server capacity information, etc.), as input to one or more machine learning algorithms to identify a movement strategy for the data storage volume. As illustrated in FIG. 3, the identified movement strategy involves reassigning the replicas of the data storage volume.

The movement system 302 may identify, for the particular data storage volume, a first server 308 that maintains the master replica 310 for the data storage volume and a second server 312 that maintains the slave replica 314 for the data storage volume. The movement system 302 may transmit a request to the first server 308 to reassign the master replica 310 into a slave replica for the data storage volume. Further, the movement system 302 may transmit a request to the second server 312 to reassign the slave replica 314 as the master replica for the data storage volume. The movement system 302 may update a database of the block-level data storage service to indicate this reassignment of the master and slave replicas to cause any read/write operations for the data storage volume to be directed to the newly assigned master replica 314 (previously the slave replica for the data storage volume). Thus, a read/write operation from any other server 316 that utilizes the data storage volume may be directed to the newly assigned master replica 314 in the second server 312. Further, any operations that cause any change to the data of the master replica 314 in the second server 312 may cause synchronization of these changes with the slave replica 310 of the first server 308.

Figure 4:
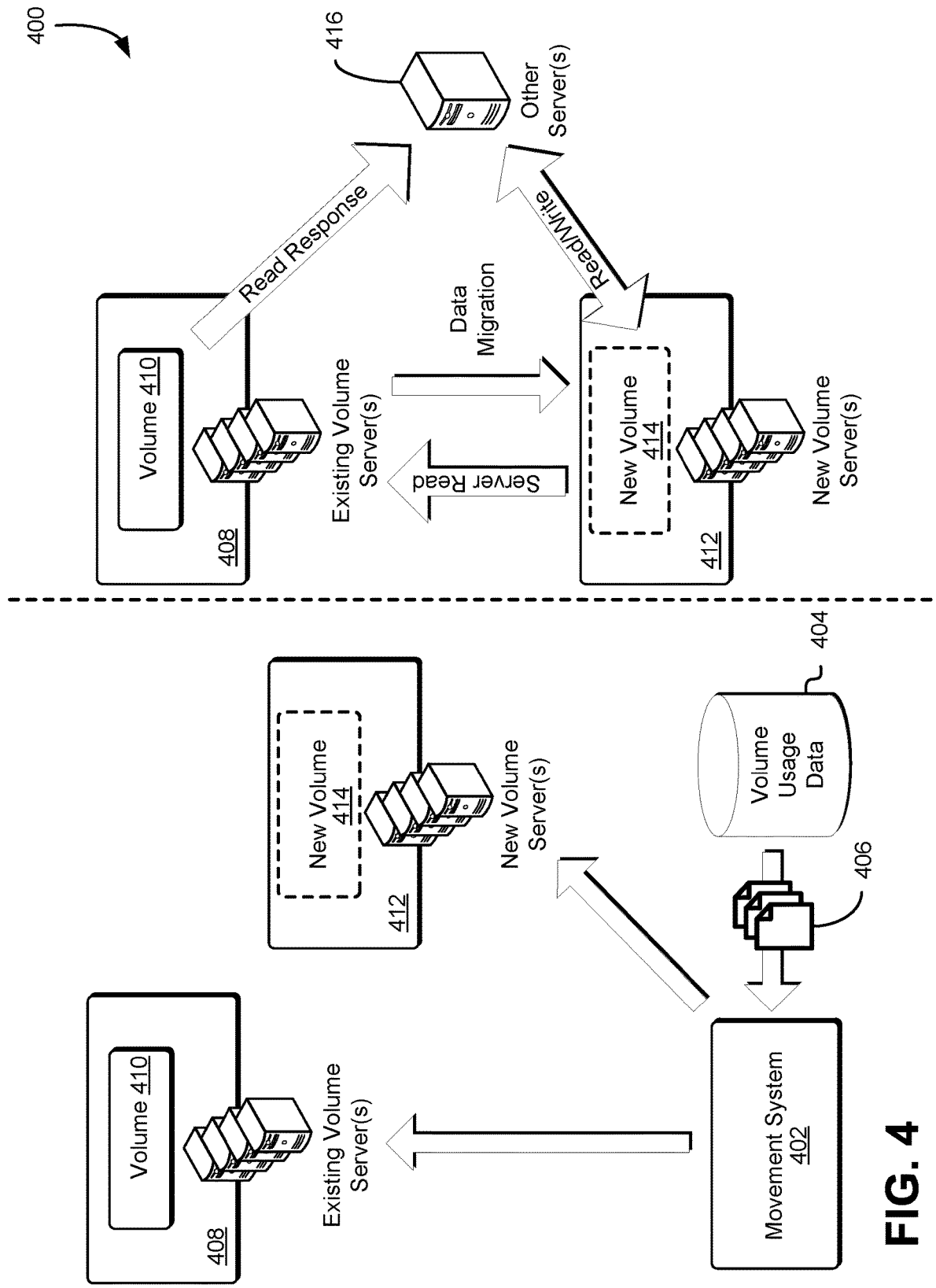
FIG. 4 shows an illustrative example of a system in which a movement system migrates data from an existing data storage volume to a new data storage volume based at least in part on volume usage data for the existing data storage volume in accordance with at least one embodiment.

As noted above, the movement system, based at least in part on volume usage data for a particular data storage volume and other information from a customer profile, may determine a movement strategy for the data storage volume that includes generating a new data storage volume and migrating the data from the particular data storage volume to this newly generated data storage volume. Accordingly, FIG. 4 shows an illustrative example of a system 400 in which a movement system 402 migrates data from an existing data storage volume 410 to a new data storage volume 414 based at least in part on volume usage data 406 for the existing data storage volume 410 in accordance with at least one embodiment. Similar to the system 300 described above in connection with FIG. 3, in the system 400, the movement system 402 obtains volume usage data 406 for a particular data storage volume from the volume usage data repository 404 and uses this volume usage data 406 to identify a movement strategy for the data storage volume. In an embodiment, the movement strategy identified by the movement system 402 involves creating a new data storage volume 414 utilizing a set of new volume servers 412 that are distinct from a set of existing volume servers 408 that may collectively manage an existing data storage volume 410.

Based at least in part on the identified movement strategy, the movement system 402 identifies a set of new volume servers 412 that are distinct from a set of existing volume servers 408 that implement the existing data storage volume 410 from which the volume usage data 406 was obtained. Within the identified set of new volume servers 412, the movement system 402 may generate a master replica and a slave replica for the new data storage volume 414 that is to replace the existing data storage volume 410. Further, the movement system 402 may initiate migration of the data of the existing data storage volume 410 to the replicas of the new data storage volume 414. In an embodiment, the movement system 402 updates a database of the block-level data storage service to indicate that any read or write operations for data from data storage volume 410 are to be directed to the new data storage volume 414. This may prevent any data from being written to the existing data storage volume 410.

In an embodiment, the new data storage volume 414 processes incoming read requests from the other servers 416 and users. If the new data storage volume 414 does not have the data necessary to fulfill the read request, the new data storage volume 414 may redirect the read request to the existing data storage volume 410. For instance, if the new data storage volume 414 does not have the requested data, it may serve as an indication that the requested data has not been migrated from the existing data storage volume 410 to the new data storage volume 414. The existing data storage volume 410, which receives the read request from the new data storage volume 414, may process and fulfill the request if the data is still available within the existing data storage volume 410.

The movement system 402 may continue to monitor the migration of data from the existing data storage volume 410 to the new data storage volume 414 to determine whether the migration process has been completed. If the migration process has been completed, the movement system 402 may update the database of the block-level data storage service to indicate that the new data storage volume 414 can now be utilized for read and write operations, while terminating any association between any other computing resources and the existing data storage volume 410. The movement system 402 may also, in some instances, terminate the existing data storage volume 410. In an embodiment, the movement system 402 maintains the existing data storage volume 410 as additional slave replicas for the master replica of the new data storage volume 414. Thus, data manipulated via the master replica of the new data storage volume 414 is synchronized with the replicas of the existing data storage volume 410.

As noted above, the movement system, based at least in part on volume usage data for a particular data storage volume and other information from a customer profile, may determine a movement strategy for the data storage volume that includes generating a new replica for a data storage volume and removing an obsolete replica. This movement strategy may be implemented, for example, if a server that maintains a replica is scheduled for maintenance and, thus, will be unavailable for a period of time. This movement strategy may also be implemented if it is required to redistribute volume replicas among the various block-level data storage service servers to maintain a sufficient distribution to prevent correlated volume failures in the event of a component loss. Accordingly, FIG. 5 shows an illustrative example of a system 500 in which a movement system 502 generates a new volume replica 520 for a data storage volume 508 and removes an obsolete volume replica 516 based at least in part on volume usage data 506 for the data storage volume 508 in accordance with at least one embodiment.

In the system 500, the movement system 502 obtains volume usage data 506 corresponding to the data storage volume 508 from the volume usage data repository 504. The movement system 502 may use the volume usage data 506, as well as other information associated with the data storage volume 508, as input to one or more machine learning algorithms to identify a movement strategy for the data storage volume 508. The movement strategy, as illustrated in FIG. 5, specifies that a new replica for the data storage volume 508 is to be created to replace an existing replica of the data storage volume 508. This existing replica may be implemented on a server that is to undergo maintenance or is otherwise selected based at least in part on a requirement to redistribute the various replicas of the data storage volumes of the block-level data storage service.

Figure 5:
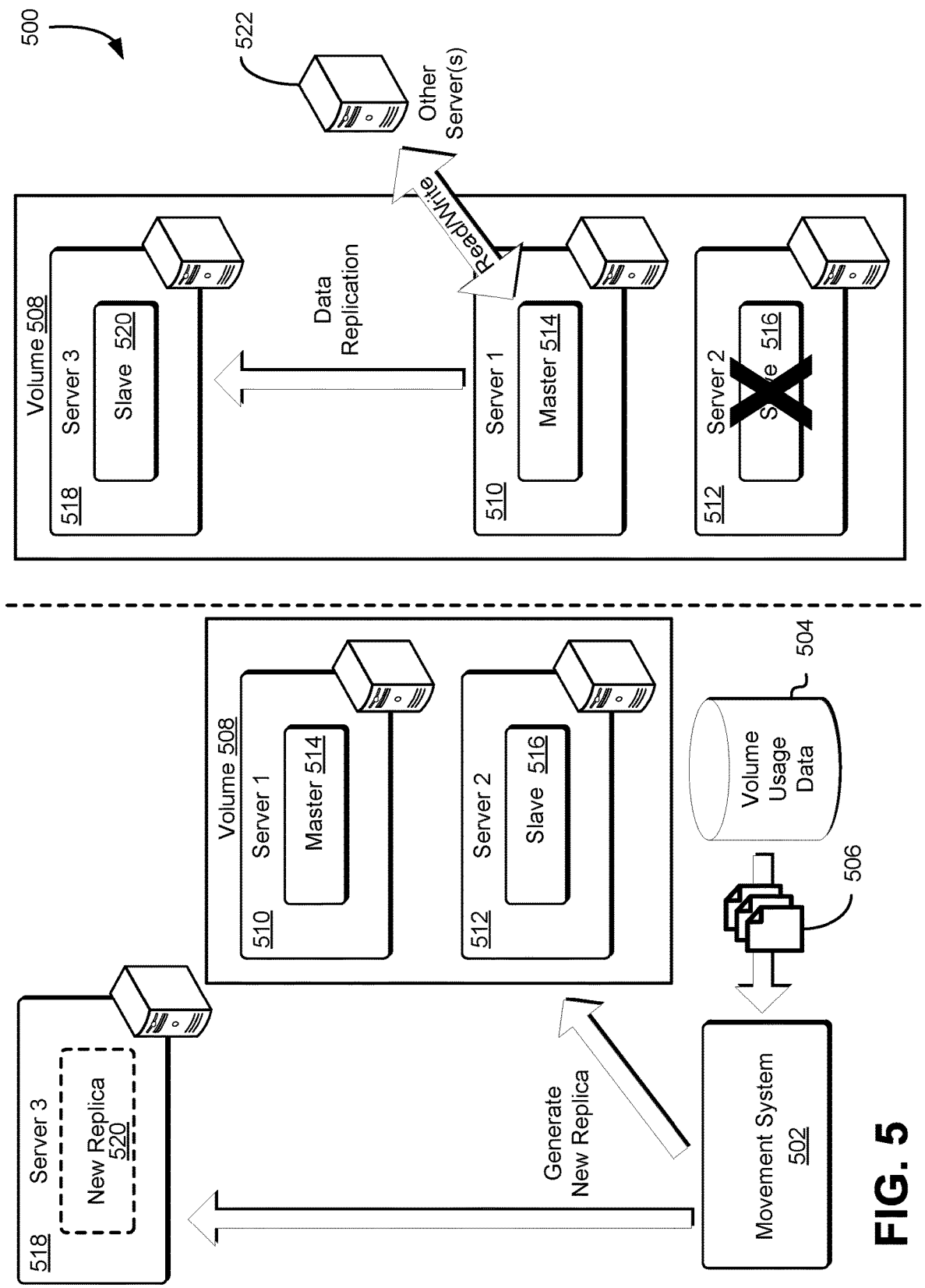
FIG. 5 shows an illustrative example of a system in which a movement system generates a new volume replica for a data storage volume and removes an obsolete volume replica based at least in part on volume usage data for the data storage volume in accordance with at least one embodiment.

In response to identifying this movement strategy, the movement system 502 identifies a new data server 518 (e.g., Server 3, as illustrated in FIG. 5) that has sufficient capacity (e.g., storage and IOPS) to maintain the new replica 520 for the data storage volume 508. From the movement strategy, the movement system 502 may determine which replica of the data storage volume 508 is to be replaced. For instance, the movement strategy may indicate that the master replica 514 of the data storage volume 508, maintained on a first server 510, is to be replaced with the new replica 520. Alternatively, the movement strategy may indicate that the slave replica 516 of the data storage volume 508, maintained on a second server 512, is to be replaced with the new replica 518. As illustrated in FIG. 5, the latter scenario is demonstrated.

The movement system 502 may access the identified data server 518 and create the new volume replica 520 using the identified data server 518. Once the new volume replica 520 has been created, the movement system 502 may replicate the data from the obsolete replica 516 (e.g., the slave replica of the data storage volume 508) on to the new replica 520, which is to function as the new slave replica for the data storage volume 508. The movement system 502 may monitor the replication process to determine whether the data of the obsolete replica 516 has been completely replicated on to the new replica 520. If the replication process has been completed, the movement system 502 may update the database of the block-level data storage service to indicate that the new replica 520 is associated with the data storage volume 508. Further, the movement system 502 may remove the association between the data storage volume 508 and the obsolete replica 516. This may prevent further operations from being performed (e.g., read/write operations, synchronization operations, etc.) using the obsolete replica 516. Further, the movement system 502 may remove the obsolete replica 516 from its server 512. In an embodiment, the obsolete replica 516 is maintained as an additional slave replica for the data storage volume 508.

Figure 6:
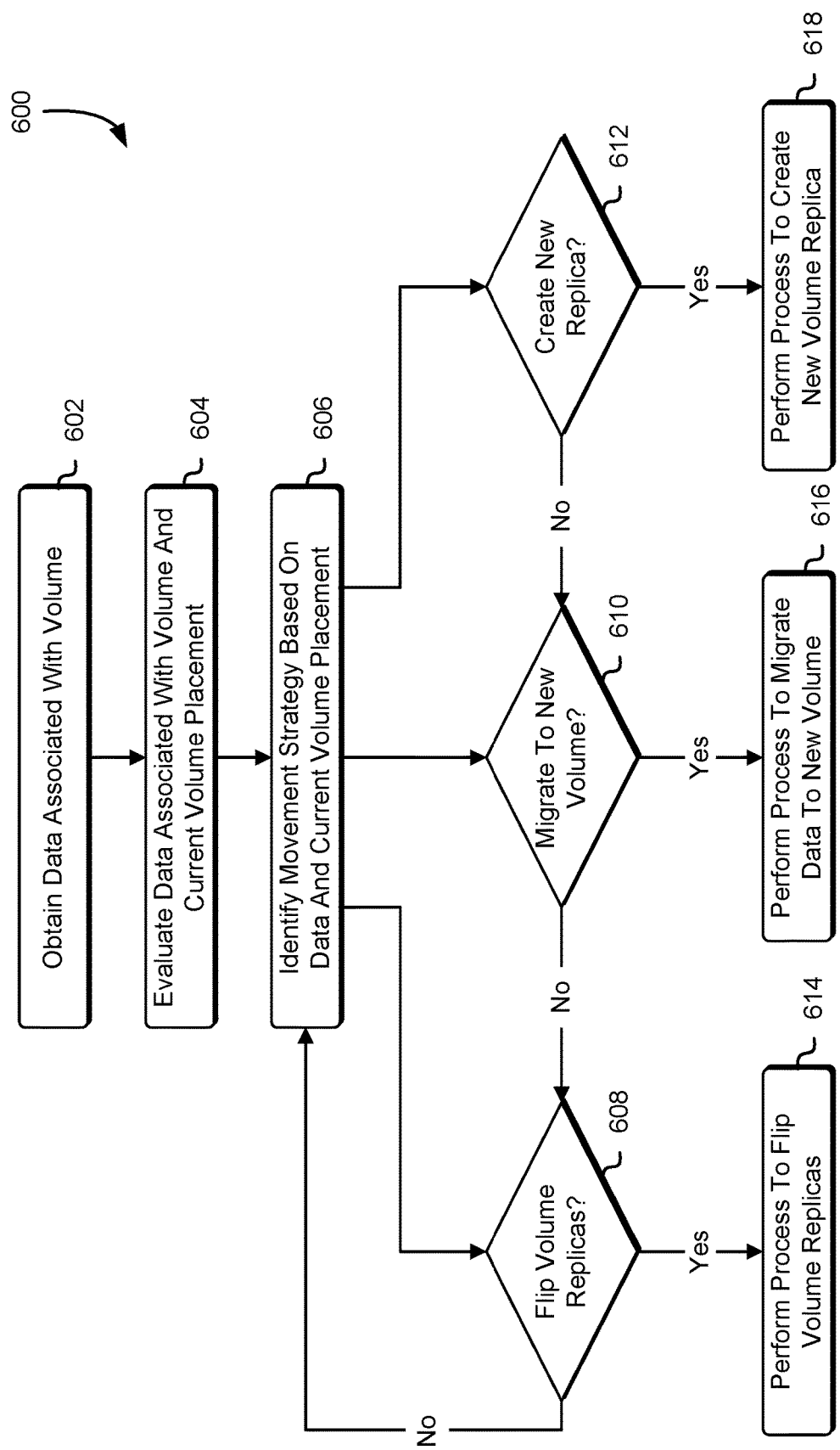
FIG. 6 shows an illustrative example of a process for identifying and performing a set of operations based at least in part on a movement strategy for a data storage volume in accordance with at least one embodiment.

As noted above, a movement system of the block-level data storage service may utilize volume usage data for a particular data storage volume, as well as other information from a customer profile associated with the data storage volume and from the servers that maintain the data storage volume, as input to one or more machine learning algorithms to identify a movement strategy for the data storage volume. This movement strategy may indicate an optimal set of operations for the data storage volume, which may include generating a new replica for the data storage volume, migrating the data from the data storage volume to a new data storage volume, and reassigning the replicas of the data storage volume. Accordingly, FIG. 6 shows an illustrative example of a process 600 for identifying and performing a set of operations based at least in part on a movement strategy for a data storage volume in accordance with at least one embodiment. The process 600 may be performed by the aforementioned movement system. In some instances, the process 600 may be performed by another computer system, process, or application operating in conjunction with the movement system.

At any time, the movement system may obtain 602 data associated with a particular data storage volume for evaluation. This data may specify the IOPS usage for the data storage volume over a period of time. Further, the data may specify the storage capacity utilized by the replicas of the data storage volume among the respective servers that are used to maintain the replicas. The data, in some instances, may also specify characteristics of these servers, such as the IOPS and storage capacities for each of these servers and information regarding any future maintenance or unavailability events. In an embodiment, the movement system also obtains information from a customer profile associated with the data storage volume. This information from the customer profile may specify other resources that may utilize the data storage volume for a variety of purposes, as well as the IOPS and storage requirements of these resources in accessing the data storage volume.

Using the volume usage data and the other information from the customer profile, the movement system may evaluate 604 the volume usage data and the other information to identify 606 a movement strategy for the data storage volume. In an embodiment, the movement system uses the data associated with the data storage volume as input to one or more machine learning algorithms to obtain an output that represents a movement strategy for the data storage volume.

In an embodiment, based on the identified movement strategy, the movement system determines 608 whether the movement strategy indicates that the replicas of the data storage volume are to be flipped (e.g., reassigned) such that the master replica of the data storage volume is reassigned to be the slave replica of the data storage volume, and vice versa. If the movement system determines that the replicas of the data storage volume are to be flipped, the movement system may perform 614 a process to flip the replicas of the data storage volume. This process is described in greater detail in the present disclosure in connection with FIGS. 3 and 7. However, if the movement system determines that an alternative movement strategy is to be implemented, the movement system may identify 606 this alternative movement strategy and perform a process according to the alternative movement strategy.

In an embodiment, the movement system determines 610, based on the identified movement strategy, whether the movement strategy indicates that data from the data storage volume is to be migrated to a new data storage volume. For example, if the movement system determines that at least one server of the data storage volume is running out of capacity to support additional write operations for the data storage volume, the movement system may determine that a new volume needs to be created to support further read/write operations corresponding to the data of the volume. Thus, if the movement system determines, based on the movement strategy, that a new volume is to be created to enable migration of data from the data storage volume to the new volume, the movement system may perform 616 a process to perform this migration. This process is described in greater detail in the present disclosure in connection with FIGS. 4 and 8. However, if the movement system determines that migration to a new volume is not the ideal movement strategy for the particular data storage volume, the movement system may determine 608 whether flipping the replicas of the data storage volume is an ideal movement strategy.

In an embodiment, the movement system determines 612, based on the identified movement strategy, whether the movement strategy indicates that a new replica is to be created for the data storage volume. For instance, if the movement system determines that a server that maintains a replica of the volume is scheduled for maintenance and, as a result, will be rendered inoperable for a period of time, the movement system may determine that a new replica is to be created for the volume to maintain data availability and redundancy for the volume. Thus, if the movement system determines, based on the movement strategy, that a new replica is to be created for the data storage volume, the movement system may perform 618 a process to create a new volume replica for the data storage volume. This process is described in greater detail in the present disclosure in connection with FIGS. 5 and 9. However, if the movement system determines that creation of a new replica for the data storage volume is not the ideal movement strategy for the particular data storage volume, the movement system may determine 610 whether migration of data to a new data storage volume is an ideal movement strategy. It should be noted that while the process 600 illustrated in FIG. 6 denotes serial determinations with regard to which movement strategy is to be performed, the movement strategy may be determined in parallel, whereby a movement strategy is selected from the various available movement strategies without need to perform a serial determination for each available strategy.

If the identified movement strategy corresponds to the current placement of the data storage volume, the movement system may maintain the data storage volume in its present servers and continue to obtain 602 usage data for the data storage volume. Thus, the movement system may continue to evaluate volume usage data for the data storage volume over time to determine if and when an alteration to the placement of the data storage volume is needed. However, if, based at least in part on the identified movement strategy, the movement system determines that the placement of the data storage volume is to be altered, the movement system may perform 610 a set of operations in accordance to the movement strategy to alter the placement of the data storage volume. As will be described in greater detail below in connection with FIGS. 7-9, the movement system may create a new replica for the data storage volume and remove an obsolete replica, reassign the replicas of the data storage volume, or migrate the data from the data storage volume to another data storage volume. It should be noted that while these placement strategies are described extensively for the purpose of illustration, other placement strategies may be implemented.

Figure 7:
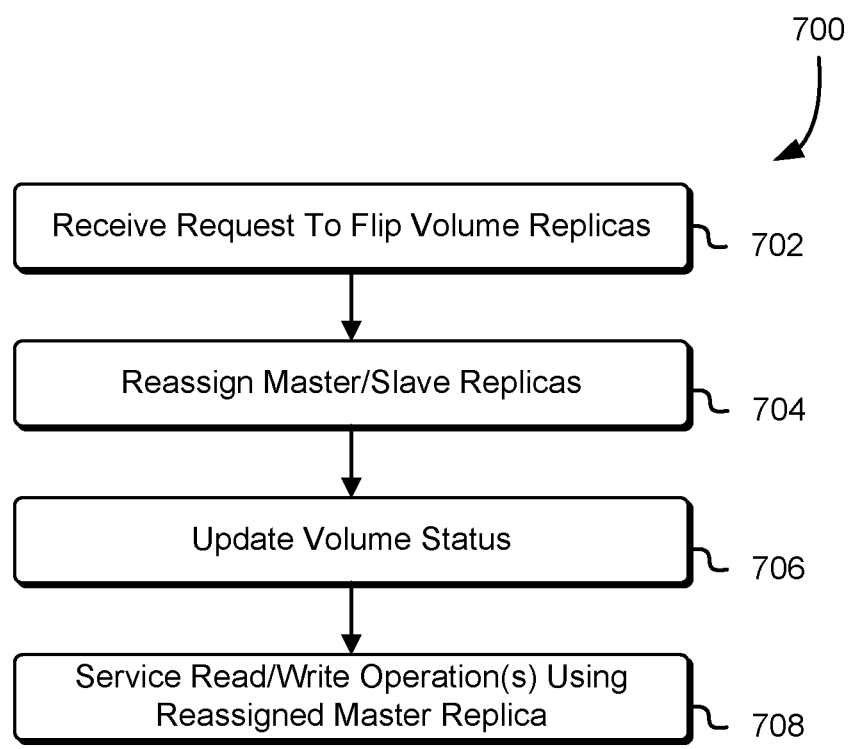
FIG. 7 shows an illustrative example of a process for changing the assignment of a master replica and of a slave replica of a data storage volume in accordance with at least one embodiment.

As noted above, the movement system may identify a movement strategy that involves reassignment of the replicas of a data storage volume such that the master replica of the data storage volume is reassigned to be the slave replica and vice versa. For instance, if based on the usage data for the data storage volume, the movement system determines that the server that maintains the master replica of the data storage volume is running out of available IOPS capacity to support usage of the master replica, the movement system may determine that reassignment of the replicas of the data storage volume is required to ensure continued availability of the data storage volume. Accordingly, FIG. 7 shows an illustrative example of a process 700 for changing the assignment of a master replica and of a slave replica of a data storage volume in accordance with at least one embodiment. The process 700 may be performed by a computer system, process, or application operating in conjunction with the movement system to implement the identified movement strategy. The computer system may interact with the servers that maintain the data storage volume to cause performance of the operations described herein. In some instances, the computer system, process, or application may be a sub-system of the movement system.

The computer system may receive 702 a request from the movement system to flip (e.g., reassign) the replicas of a data storage volume. The request may specify an identifier corresponding to the master replica of the data storage volume and an identifier corresponding to the slave replica of the data storage volume. Further, the request may specify, for each replica, an identifier corresponding to the server that maintains the replica. Thus, the computer system may utilize this information to identify the servers that implement the replicas of the data storage volume and the replicas themselves.

In response to the request, the computer system may access the identified servers to reassign 704 the master and slave replicas of the data storage volume. For instance, the computer system may modify metadata corresponding to the master replica to indicate that it is now the slave replica for the data storage volume. Similarly, the computer system may modify metadata corresponding to the slave replica to indicate that it is now the master replica for the data storage volume. Thus, the new master replica, which previously was the slave replica for the data storage volume, may support read/write operations for the data storage volume. Further, any data manipulations of the new master replica are synchronized with the slave replica in order to maintain identical replication of the data storage volume.

In addition to reassigning the master and slave replicas of the data storage volume, the computer system or the movement system may update 706 the status of the data storage volume to indicate the location of the new master replica that can support read/write operations for the data storage volume. For instance, the computer system or movement system may update a database of the block-level data storage service to indicate this reassignment of the master and slave replicas to cause any read/write operations for the data storage volume to be directed to the newly assigned master replica (previously the slave replica for the data storage volume). Thus, a read/write operation from any other server that utilizes the data storage volume may be directed to the newly assigned master replica. This enables the block-level data storage service to service 708 any read/write operations for the data storage volume using the reassigned master replica that was previously the slave replica.

Figure 8:
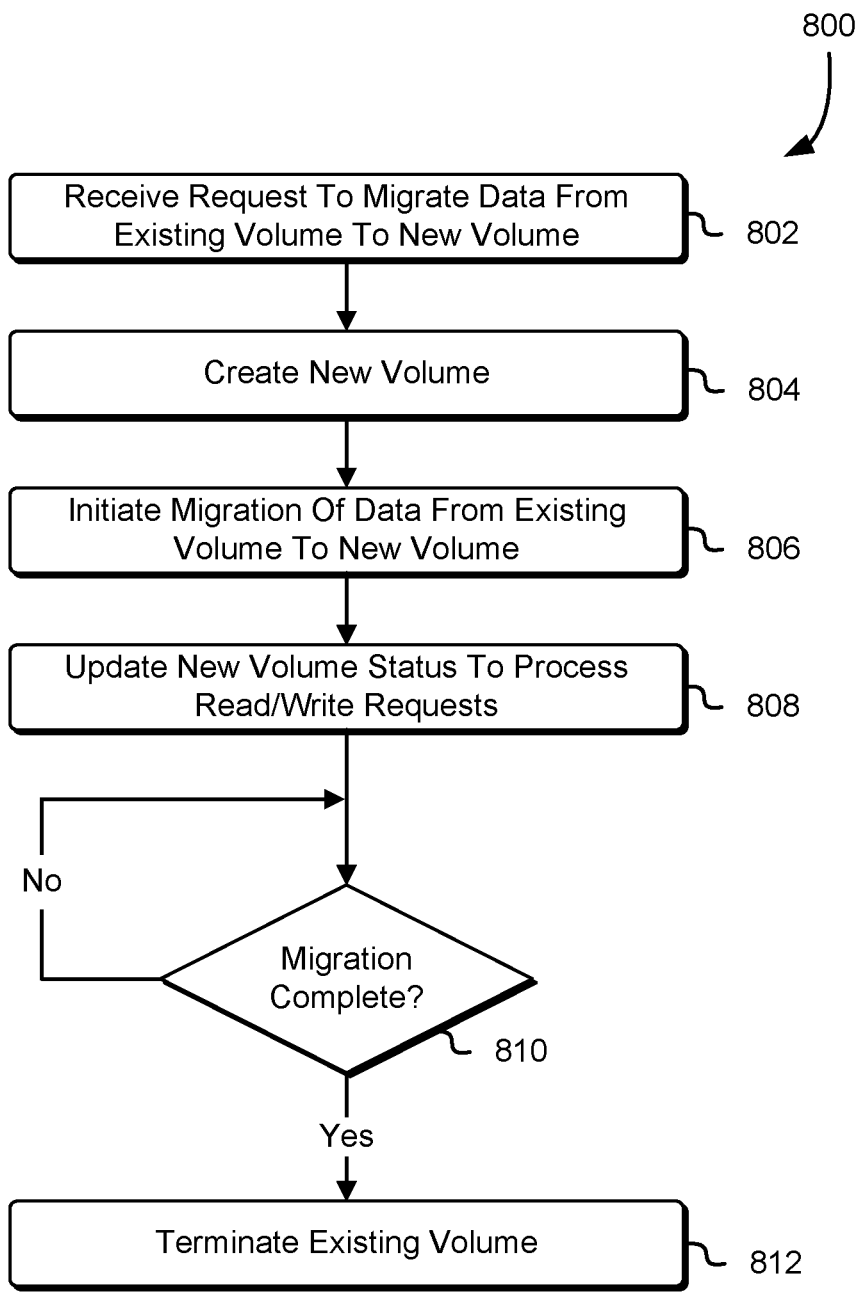
FIG. 8 shows an illustrative example of a process for migrating an data from an existing data storage volume to a new data storage volume in response to a request for migration of the data in accordance with at least one embodiment.

In some instances, the movement system may identify an alternative movement strategy to that described above in connection with FIG. 7. For example, the movement system may identify a movement strategy that involves creating a new data storage volume to replace an existing data storage volume. For instance, if the movement system determines that at least one server of the data storage volume is running out of capacity to support additional write operations for the data storage volume, the movement strategy may indicate that a new volume needs to be created to support further read/write operations corresponding to the data of the volume. Accordingly, FIG. 8 shows an illustrative example of a process 800 for migrating an data from an existing data storage volume to a new data storage volume in response to a request for migration of the data in accordance with at least one embodiment. The process 800 may be performed by a computer system, process, or application operating in conjunction with the movement system to implement the identified movement strategy. The computer system may interact with the servers that maintain the data storage volume and with servers selected for implementation of a new data storage volume to cause performance of the operations described herein. In some instances, the computer system, process, or application may be a sub-system of the movement system.

The computer system may receive 802 a request from the movement system to create a new data storage volume and to migrate data from an existing data storage volume to this new data storage volume. The request may specify characteristics of the existing data storage volume, such as the storage capacity and IOPS requirements of the existing data storage volume. In response to the request, the computer system may identify a set of servers that may implement the replicas of the new data storage volume. For instance, the computer system may evaluate the servers provided by the block-level data storage service to identify a set of servers that have both the storage capacity and IOPS capacity to support the replicas of the new data storage volume. In an embodiment, the selected servers for implementation of the new data storage volume are distinct from those used to implement the existing data storage volume.

Using the identified set of servers, the computer system may create 804 the new data storage volume. The computer system may select a first server of the set of servers to implement the master replica of the new data storage volume. Further, the computer system may select a second server of the set of servers to implement the slave replica of the new data storage volume. If the new data storage volume is created successfully, the movement system may initiate 806 migration of the data from the existing data storage volume to the replicas of the new data storage volume. The computer system may transmit a request to an application, system, or process of each of the servers that implement the existing data storage volume to transmit the data from these servers to the replicas of the new data storage volume.

In an embodiment, as data is being migrated to the new data storage volume, the computer system updates 808 the status of the new data storage volume to enable the new data storage volume to process incoming read and write requests. For example, if the new data storage volume receives a request to perform one or more write operations, the new data storage volume may fulfill the request and write the specified data to the new data storage volume. This may prevent any data from being written to the existing data storage volume. However, for data that is still maintained in the existing data storage volume during the migration process may be processed by the existing data storage volume. For instance, if the new data storage volume determines, in response to a read request, that the data is still maintained by the existing data storage volume, the new data storage volume may redirect the read request to the existing data storage volume. This may cause the existing data storage volume to provide the requested data in response to the request. The computer system may monitor the migration process to determine 810 whether the migration of data from the existing data storage volume to the new data storage volume has been completed. If the migration process has not been completed, the computer system may continue to monitor the migration process until such time that it has completed.

If migration of the data from the existing data storage volume to the new data storage volume has been completed, the computer system may update the status of the new data storage volume to discontinue any redirection of read requests to the existing data storage volume, as all data is now available through the new data storage volume. Further, the computer system may remove, from the database, any association between the existing data storage volume and these other resources. The computer system may terminate 812 the existing data storage volume in order to make available storage and IOPS capacity on the servers that maintained the replicas of the existing data storage volume. In an embodiment, the replicas of the existing data storage volume may be reassigned to serve as slave replicas of the new data storage volume. This may provide additional redundancy for the new data storage volume in the event of a component failure or other unavailability of a server of the new data storage volume.

Figure 9:
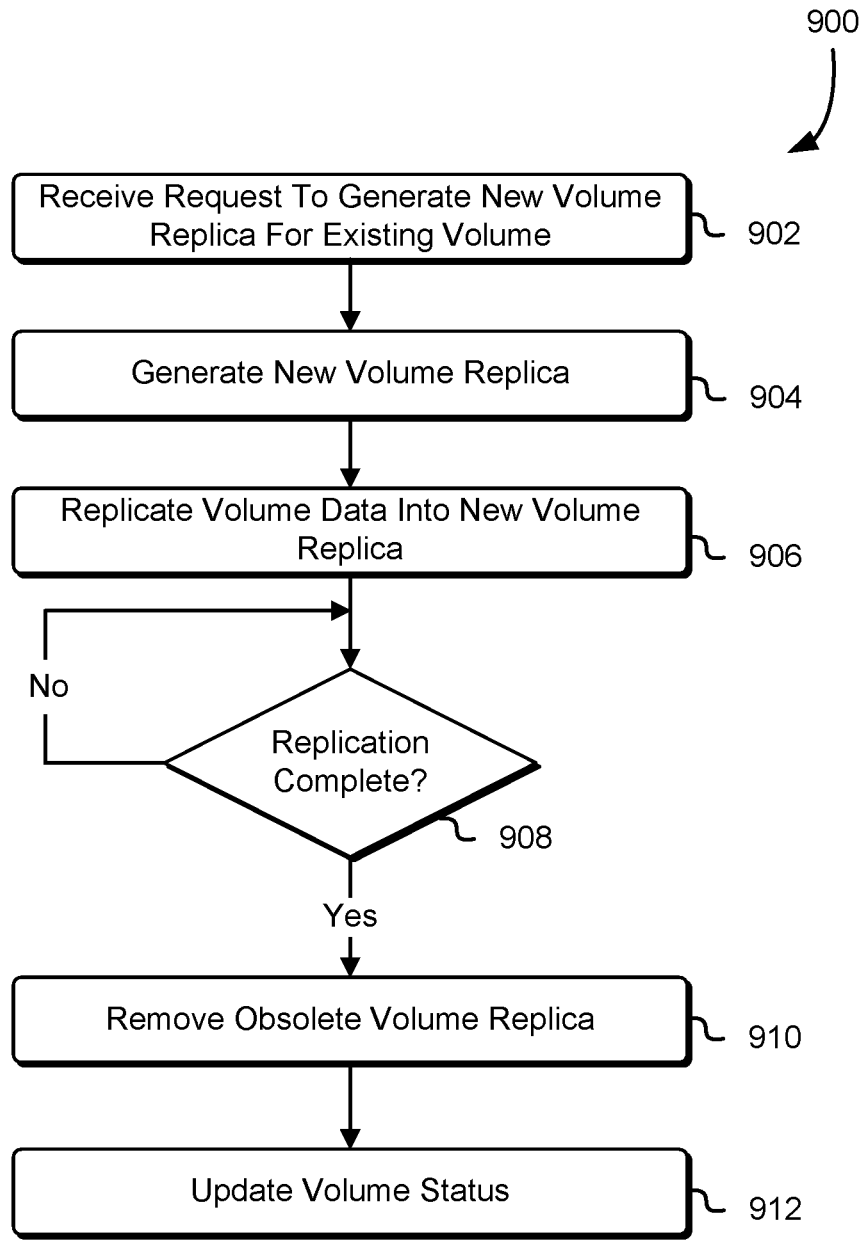
FIG. 9 shows an illustrative example of a process for generating a new volume replica and removing an obsolete volume replica for a data storage volume in accordance with at least one embodiment.

The movement system may identify an alternative movement strategy, which indicates that a new replica is to be created for the data storage volume to replace an existing replica. For instance, if the movement system determines that a server that maintains a replica of the volume is scheduled for maintenance and, as a result, will be rendered inoperable for a period of time, the movement system may determine, based at least in part on the movement strategy, that a new replica is to be created for the volume to maintain data availability and redundancy for the data storage volume. Accordingly, FIG. 9 shows an illustrative example of a process 900 for generating a new volume replica and removing an obsolete volume replica for a data storage volume in accordance with at least one embodiment. The process 900 may be performed by a computer system, process, or application operating in conjunction with the movement system to implement the identified movement strategy. The computer system may interact with the servers that maintain the data storage volume and with a server selected for implementation of a new replica of the data storage volume to cause performance of the operations described herein. In some instances, the computer system, process, or application may be a sub-system of the movement system.

The computer system may receive 902 a request from the movement system to create a new replica for a data storage volume and to remove an obsolete replica from the data storage volume. The request may specify characteristics of the existing data storage volume, such as the storage capacity and IOPS requirements of the existing data storage volume. In response to the request, the computer system may identify a server that may implement the new replica of the new data storage volume. For instance, the computer system may evaluate the servers provided by the block-level data storage service to identify a server that has both the storage capacity and IOPS capacity to support the new replica of the data storage volume. In an embodiment, the selected server is distinct from those used to implement the replicas of the data storage volume.

If the computer system is able to identify a server that may implement the new replica, the computer system may generate 904 the new replica within this server and replicate 906 the data from the data storage volume on to the new replica. The computer system may monitor this replication process to determine 908 whether replication of the data from the data storage volume has been completed. If the replication process has not been completed, the computer system may continue to monitor this process until it receives an indication that replication has been completed for the new replica. This may include receiving a notification from the server that maintains the new replica that replication has been completed. Alternatively, this may include an analysis of the new replica to determine whether the amount of data stored therein is identical to that of the other replicas of the data storage volume.

If the computer system determines that replication has been completed for the new replica, the computer system may remove 910 the obsolete replica from the data storage volume. This may make available IOPS and storage capacity on the server that maintained the obsolete replica for the data storage volume. In an embodiment, rather than removing the obsolete volume replica from the data storage volume, the computer system may maintain the obsolete volume replica as an additional slave replica for the data storage volume. This may provide additional redundancy for the data storage volume. The computer system may also update 912 the status of the data storage volume to indicate that a new replica has been created and implemented for the data storage volume. For instance, the computer system may update the database of the block-level data storage service to indicate that the new replica is associated with the data storage volume. If the new replica is to serve as the master replica for the data storage volume, the computer system may indicate, via the database, that the new replica may be utilized for read/write operations associated with the data storage volume. Further, the computer system may remove, from the database, any association between the data storage volume and the obsolete replica. This may terminate any synchronization between the master replica of the data storage volume and the obsolete replica.

Figure 10:
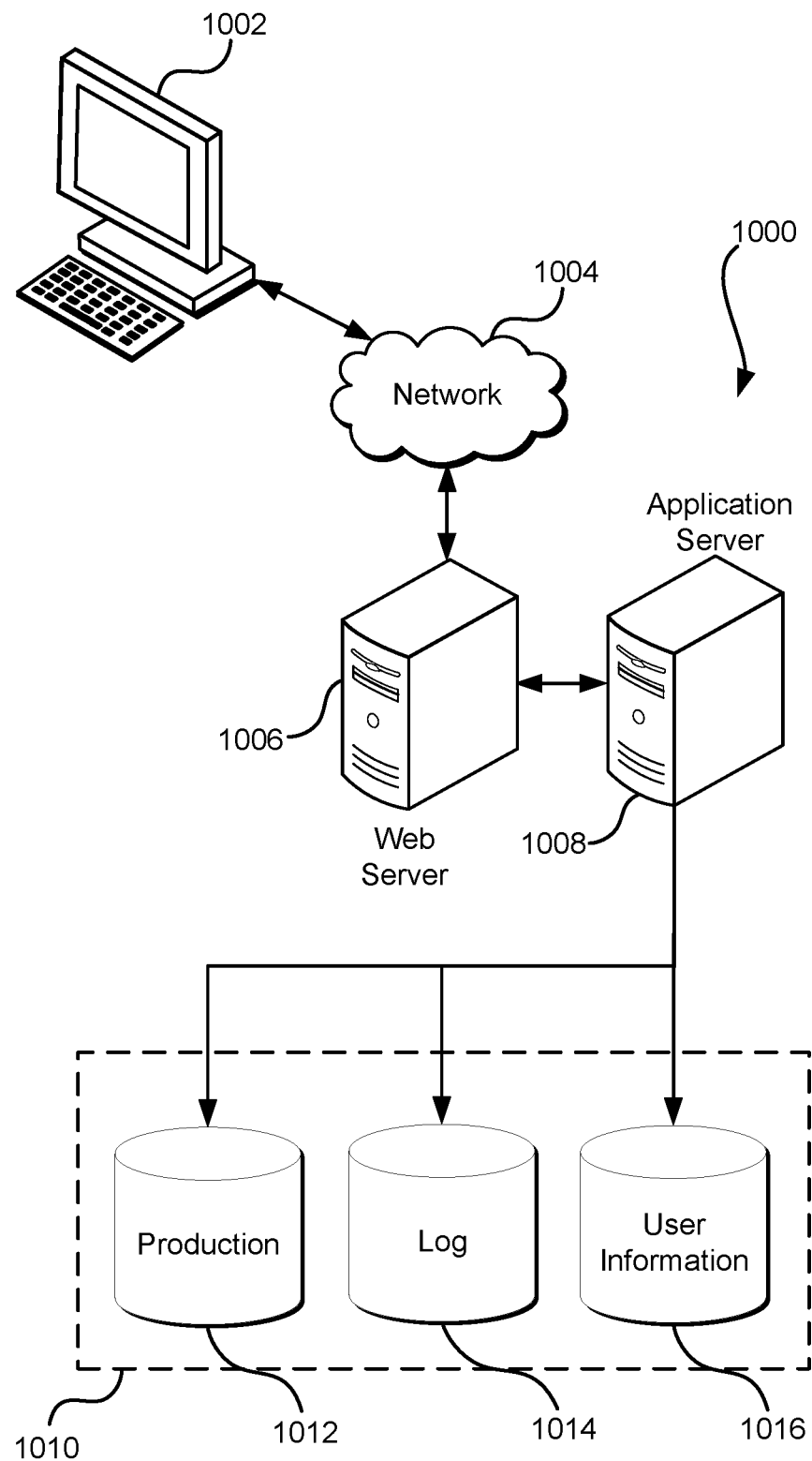
FIG. 10 shows an illustrative example of a system in which various embodiments can be implemented.

FIG. 10 illustrates aspects of an example system 1000 for implementing aspects in accordance with an embodiment. As will be appreciated, although a web-based system is used for purposes of explanation, different systems may be used, as appropriate, to implement various embodiments. In an embodiment, the system includes an electronic client device 1002, which includes any appropriate device operable to send and/or receive requests, messages, or information over an appropriate network 1004 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 1006 for receiving requests and serving content in response thereto, although for other networks an alternative device serving a similar purpose could be used as would be apparent to one of ordinary skill in the art.

In an embodiment, the illustrative system includes at least one application server 1008 and a data store 1010 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1002 and the application server 1008, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1010, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1012 and user information 1016, which are used to serve content for the production side. The data store also is shown to include a mechanism for storing log data 1014, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1010.

The data store 1010, in an embodiment, is operable, through logic associated therewith, to receive instructions from the application server 1008 and obtain, update or otherwise process data in response thereto and the application server 1008 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1002. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1000 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1000, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   determining a first operational state of a data storage volume corresponding to a first set of replicas implemented on a set of servers;
   generating first information corresponding to the first operational state and second information corresponding to operational impact to the data storage volume based on a set of possible operational states;
   generating a movement strategy for the data storage volume based at least in part on the first information and the second information, the movement strategy associated with a second operational state associated with a second set of replicas, and specifying an operation performable by the set of servers to update the first set of replicas;
   executing the movement strategy by causing the set of servers to perform the operation, thereby generating a second set of replicas;
   monitoring performance of the operation to determine that the second set of replicas is successfully generated; and
   as a result of the second set of replicas being successfully generated, providing access to the data storage volume.

2. The computer-implemented method of claim 1, wherein the operation performable by the set of servers includes:
   generating a new replica for the data storage volume; and
   replicating data from the first set of replicas to the new replica.

3. The computer-implemented method of claim 1, wherein:
   the first set of replicas comprises a master replica and a slave replica of the data storage volume; and
   the operation performable by the set of servers includes:
      reassigning the master replica as a new slave replica of the data storage volume; and
      reassigning the slave replica as a new master replica of the data storage volume.

4. The computer-implemented method of claim 1, wherein the operation performable by the set of servers includes:
   generating a second data storage volume; and
   migrating data from the data storage volume to the second data storage volume.

5. A system, comprising:
   one or more processors; and
   memory that stores computer-executable instructions that, if executed, cause the system to:
      determine a first operational state of a data storage volume corresponding to a first set of replicas;
      determine, from a set of possible operational states and based on the first operational state and operational impact to the data storage volume, a second operational state for the data storage volume;
      update the first set of replicas to generate a second set of replicas of the data storage volume, the second set of replicas associated with the second operational state; and
      update the data storage volume to operate, using the second set of replicas, in the second operational state.

6. The system of claim 5, wherein the computer-executable instructions further cause the system to utilize first information reflecting the first operational state and second information corresponding to the operational impact as input to a machine learning model configured to determine the second operational state.

7. The system of claim 5, wherein the computer-executable instructions that cause the system to update the first set of replicas to generate the second set of replicas further cause the system to:
   generate a new replica for the data storage volume; and
   replicate data from a replica of the first set of replicas to the new replica.

8. The system of claim 5, wherein the computer-executable instructions that cause the system to update the first set of replicas to generate the second set of replicas further cause the one or more processors to:
   identify, from the first set of replicas, a master replica of the data storage volume;
   identify, from the first set of replicas, a slave replica of the data storage volume;
   reassign the master replica as a new slave replica of the data storage volume; and
   reassign the slave replica as a new master replica of the data storage volume.

9. The system of claim 5, wherein the computer-executable instructions that cause the system to update the first set of replicas to generate the second set of replicas further cause the system to:
   generate a new data storage volume, the new data storage volume comprising a new set of replicas being distinct from the first set of replicas;
   generate the second set of replicas by migrating data from the first set of replicas to the new set of replicas; and
   as a result of the data having been migrated to the new set of replicas, remove the first set of replicas.

10. The system of claim 9, wherein the computer-executable instructions that cause the system to migrate the data from the first set of replicas on to the new set of replicas further cause the system to:
   receive a request to obtain a subset of the data from the data storage volume;
   determine that the subset of the data is stored in the first set of replicas of the data storage volume; and
   process the request by providing the subset of the data from the first set of replicas.

11. The system of claim 9, wherein the computer-executable instructions that cause the system to migrate the data from the first set of replicas on to the new set of replicas further cause the system to:
   receive a request to read data from the new data storage volume;
   determine that the data is stored in the first set of replicas; and
   process the request by obtaining the data from the first set of replicas.

12. The system of claim 5, wherein the computer-executable instructions that cause the system to determine the second operational state further cause the system to process information that specifies at least a storage capacity usage of the data storage volume and a rate at which input and output operations are processed using the data storage volume to determine the second operational state.

13. A non-transitory computer-readable storage medium having stored thereon executable instructions that, as a result of being executed by one or more processors of a computer system, cause the computer system to at least:
   obtain a first operational state of a first set of replicas of a data storage volume;
   identify, based at least in part on the first operational state and operational impact to the data storage volume based at least in part on a set of possible operational states, an operation performable by a set of servers to update the first set of replicas to a second operational state;
   cause the set of servers to perform the operation, thereby generating a second set of replicas associated with the second operational state; and
   provide access to the second set of replicas.

14. The non-transitory computer-readable storage medium of claim 13, wherein the executable instructions that cause the computer system to cause the set of servers to perform the operation further cause the computer system to:
   identify, from the first set of replicas, a master replica of the data storage volume;
   identify, from the first set of replicas, a slave replica of the data storage volume; and
   transmit a request to the set of servers to cause the set of servers to:
      reassign the master replica as a new slave replica of the data storage volume; and
      reassign the slave replica as a new master replica of the data storage volume.

15. The non-transitory computer-readable storage medium of claim 13, wherein the executable instructions that cause the computer system to cause the set of servers to perform the operation further cause the computer system to:
   generate, using a second set of servers, a new data storage volume;
   transmit a request to the set of servers to migrate data from the first set of replicas to the new data storage volume;
   monitor migration of the data to the new data storage volume; and
   as a result of the migration of the data to the new data storage volume being completed, cause the set of servers to remove the first set of replicas.

16. The non-transitory computer-readable storage medium of claim 15, wherein the instructions that cause the computer system to monitor the migration of the data to the new data storage volume further cause the computer system to cause the set of servers to process requests to read the data from the first set of replicas during the migration.

17. The non-transitory computer-readable storage medium of claim 15, wherein the instructions that cause the computer system to monitor the migration of the data to the new data storage volume further cause the computer system to cause a second set of servers that maintain the new data storage volume to process requests to write new data to the data storage volume by writing the new data on to the new data storage volume.

18. The non-transitory computer-readable storage medium of claim 13, wherein the executable instructions that cause the computer system to identify the operation further cause the computer system to process information that specifies at least a storage capacity utilized by the data storage volume, a rate at which other operations are performed using the data storage volume, and capacity information for the set of servers to identify the operation.

19. The non-transitory computer-readable storage medium of claim 13, wherein the instructions that cause the computer system to cause the set of servers to perform the operation further cause the computer system to:
   generate a new replica for the data storage volume; and
   cause the set of servers to replicate data from a replica of the first set of replicas to the new replica.

20. The non-transitory computer-readable storage medium of claim 13, wherein the instructions that cause the computer system identify the operation further cause the computer system to utilize first information reflecting the first operational state and second information corresponding to the operational impact as input to a machine learning model configured to determine the operation performable to update the first set of replicas.

* * * * *